(12) United States Patent
Isono

(10) Patent No.: US 11,470,256 B2
(45) Date of Patent: Oct. 11, 2022

(54) OPERATION DEVICE, OPTICAL APPARATUS, AND IMAGING APPARATUS

(71) Applicant: CANON KABUSHIKI KAISHA, Tokyo (JP)

(72) Inventor: Kosuke Isono, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/026,928

(22) Filed: Jul. 3, 2018

(65) Prior Publication Data
US 2019/0020828 A1 Jan. 17, 2019

(30) Foreign Application Priority Data
Jul. 14, 2017 (JP) .............................. JP2017-138345

(51) Int. Cl.
*H04N 5/232* (2006.01)

(52) U.S. Cl.
CPC ... *H04N 5/232945* (2018.08); *H04N 5/23212* (2013.01); *H04N 5/23216* (2013.01); *H04N 5/23293* (2013.01)

(58) Field of Classification Search
None
See application file for complete search history.

(56) References Cited

U.S. PATENT DOCUMENTS

| | | | | |
|---|---|---|---|---|
| 6,526,232 B1 * | 2/2003 | Mizumura | ............. | H04N 5/232 348/211.99 |
| 2004/0165879 A1 * | 8/2004 | Sasaki | ...................... | G02B 7/28 396/137 |
| 2006/0133791 A1 * | 6/2006 | Miyata | ............... | H04N 5/23296 396/103 |
| 2010/0296806 A1 * | 11/2010 | Seo | ................... | H04N 5/232945 396/236 |
| 2011/0200316 A1 * | 8/2011 | Sugiura | ..................... | G02B 7/10 396/131 |
| 2014/0168503 A1 * | 6/2014 | Maruyama | ......... | H04N 5/23212 348/350 |

(Continued)

FOREIGN PATENT DOCUMENTS

| | | |
|---|---|---|
| CN | 1603968 A | 4/2005 |
| CN | 104238068 A | 12/2014 |

(Continued)

*Primary Examiner* — Quan Pham
(74) *Attorney, Agent, or Firm* — Canon U.S.A., Inc. IP Division

(57) ABSTRACT

An operation device for performing control of a movable optical element to change an optical characteristic of an optical apparatus includes an operation member, a detector configured to detect an operation amount of the operation member, and a controller configured to generate a command for the control based on the operation amount. The controller is configured to cause a display to display a first region, a first mark, a second region, and a second mark. The first region corresponds to a range of values of one of the command and a controlled value for the control. The first mark indicates one of the command and the controlled value associated with the first region. The second region corresponds to a range of values of the operation amount. The second mark indicates the operation amount associated with the second region.

22 Claims, 18 Drawing Sheets

(56) References Cited

U.S. PATENT DOCUMENTS

| | | | |
|---|---|---|---|
| 2015/0042867 A1* | 2/2015 | Shiono | G02B 7/38 |
| | | | 348/348 |
| 2016/0239195 A1* | 8/2016 | Takahashi | G06T 11/206 |
| 2016/0353000 A1* | 12/2016 | Corcoran | H04M 1/0264 |
| 2016/0353032 A1* | 12/2016 | Ichihara | H04N 5/23293 |
| 2018/0041563 A1* | 2/2018 | Yoden | H04L 67/02 |

FOREIGN PATENT DOCUMENTS

| | | |
|---|---|---|
| JP | 2000-305006 A | 11/2000 |
| JP | 2002-287007 A | 10/2002 |
| JP | 2007-322481 A | 12/2007 |
| JP | 2008-299771 A | 12/2008 |
| JP | 2011-013433 A | 1/2011 |

* cited by examiner

OPERATION DEVICE, OPTICAL APPARATUS, AND IMAGING APPARATUS

BACKGROUND OF THE INVENTION

Field of the Invention

One disclosed aspect of the embodiments relates to an operation device, an optical apparatus, and an imaging apparatus.

Description of the Related Art

There is known an object distance display apparatus with a lens system in which a focus lens in a lens device is moved by a focus instruction unit (Japanese Patent Laid-Open No. 2002-287007). This apparatus is configured to acquire a focus instruction position specified by the focus instruction unit and to display an object distance corresponding to the focus instruction position on the basis of the focus instruction position.

The object distance display apparatus disclosed in Japanese Patent Laid-Open No. 2002-287007 merely displays the object distance as described above and is not capable of sensuously (e.g., visually) displaying or designating the relationship between the operation amount of an operation member for controlling an optical element and the operation command value or the controlled value. In this respect, the apparatus suffers from a disadvantage in terms of the operability of the operation member.

SUMMARY OF THE INVENTION

The present invention provides, for example, an operation device advantageous in operability of an operation member therein.

An aspect of the embodiments provides an operation device for performing control of a movable optical element to change an optical characteristic of an optical apparatus. The operation device includes an operation member, a detector configured to detect an operation amount of the operation member, and a controller configured to generate a command for the control based on the operation amount. The controller is configured to cause a display to display a first region, a first mark, a second region, and a second mark. The first region corresponds to a range of values of one of the command value and a controlled value for the control. The first mark indicates one of the command and the controlled value associated with the first region. The second region corresponds to a range of values of the operation amount. The second mark indicates the operation amount associated with the second region.

Further features of the disclosure will become apparent from the following description of exemplary embodiments with reference to the attached drawings.

DESCRIPTION OF THE EMBODIMENTS

Figure 1:
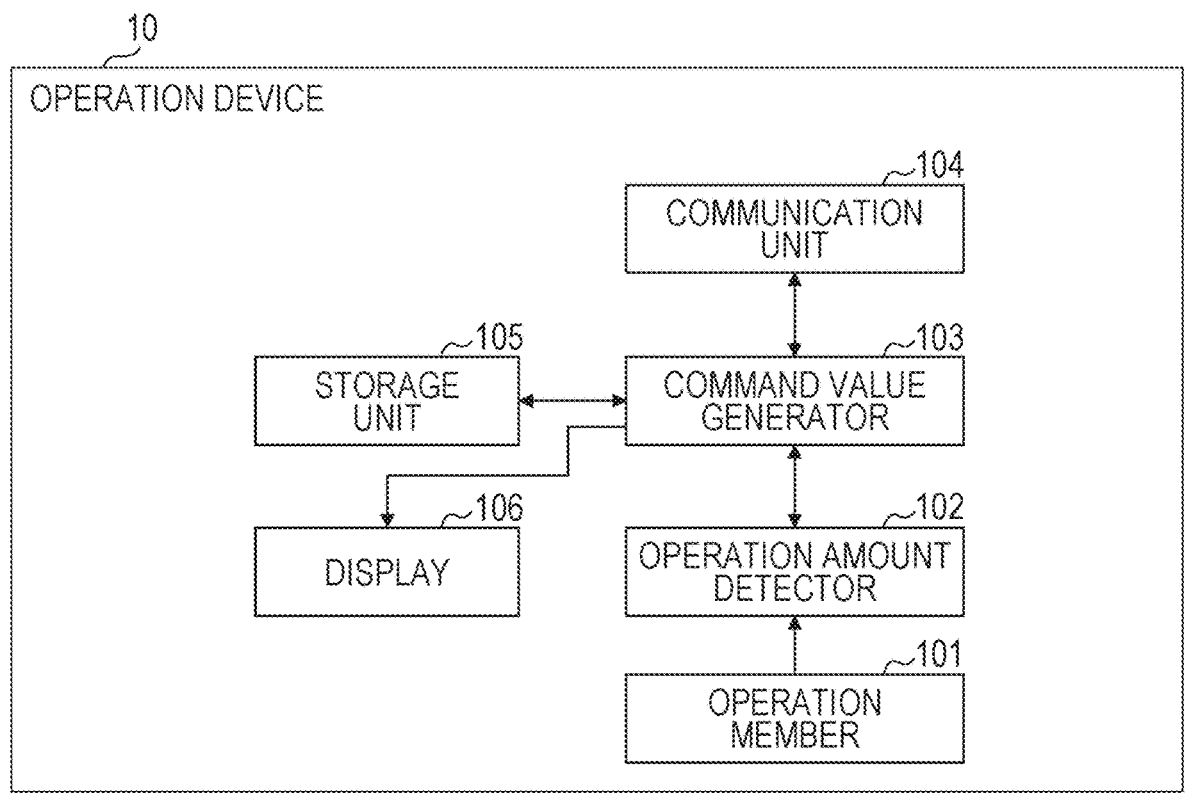
FIG. 1 illustrates a configuration example of an operation device according to a first exemplary embodiment.

Hereinafter, exemplary embodiments of the disclosure will be described with reference to the accompanying drawings. It is to be noted that, throughout the drawings for describing the exemplary embodiments, generally (unless indicated otherwise), identical members are given identical reference characters, and duplicate descriptions thereof will be omitted.

First Exemplary Embodiment

A first exemplary embodiment will be described with reference to FIG. 1 to FIG. 6B. FIG. 1 illustrates a configuration example of an operation device according to the first exemplary embodiment. FIG. 1 illustrates an operation device 10, which is also referred to as a focus demand or simply as a demand herein. The operation device 10 is used to control a movable optical element for varying, changing, or adjusting an optical characteristic of an optical device or apparatus. The movable optical element is not illustrated in FIG. 1, but the movable optical element may be a focus lens 204 illustrated in FIG. 17. The optical characteristic is an object distance herein. The optical apparatus is not illustrated in FIG. 1, but the optical apparatus may be a lens device 20 illustrated in FIG. 17.

An operation member 101 herein is for a user (e.g., a photographer) to control a focus lens and may be a knob to be rotated for operation, for example. An operation amount detector 102 (also referred to simply as a detector) may include a potentiometer or a rotary encoder, for example, and detects an operation amount or an operation position of the operation member 101. A command value generator 103 (also referred to as a main controller or a controller) generates a focus operation command value (also referred to simply as an operation command value or a command value or a command) on the basis of an output (the operation amount mentioned above) from the operation amount detector 102. The command value generator 103 also functions as a main controller configured to control each unit. A communication unit 104 (also referred to as a demand communication unit) encodes the focus operation command value generated by the command value generator 103 into a code that is compliant with a specific communication protocol. The communication unit 104 then transmits the resultant code to another communication unit (e.g., a communication unit 201 illustrated in FIG. 17, which is also referred to as a lens communication unit) of an optical apparatus (not illustrated) (e.g., the lens device 20). In addition, the communication unit 104 may receive specific information (e.g., the positional information of the focus lens 204) pertaining to the optical apparatus from a communication unit (e.g., the communication unit 201) of the optical apparatus.

Figure 23:
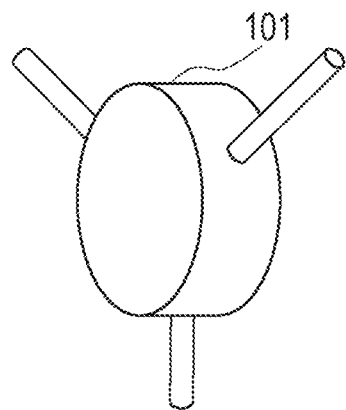
FIG. 23 illustrates a specific example of an operation member.

FIG. 23 illustrates a specific example of the operation member. The operation member 101 is supported by a mechanism that allows the operation member 101 to rotate and has its rotatable angular range regulated by a mechanical holding device (e.g., a stopper). This configuration allows for sensuously grasping the relationship between the operation amount (e.g., angle of rotation) of the operation member 101 and the command value. In order to vary or set the optical characteristic with the use of the operation member 101, the operability of the operation member 101 is important. In particular, with regard to the operation device that is capable of changing the relationship between the operation amount and the command value, the operation device that can sensuously (e.g., visually) display or indicate the stated relationship may be advantageous in terms of the operability.

A storage unit 105 stores information on a first region and a second region. The first region corresponds to a range of values of the command value or a range of values which the command value can take or can be set, and the second region corresponds to a range of values of the operation amount or a range of values which the operation amount can take or can be set. A display 106 may include a well-known display device, such as various types of displays, and any type of display that allows the user to recognize necessary information visually or through any other sensatory stimulus may be employed. As will be described later in detail, the command value generator 103 causes the display 106 to display information stored in the storage unit 105, information on a first mark indicating the command value, and information on a second mark indicating the operation amount along with any necessary association there among.

Figure 2:
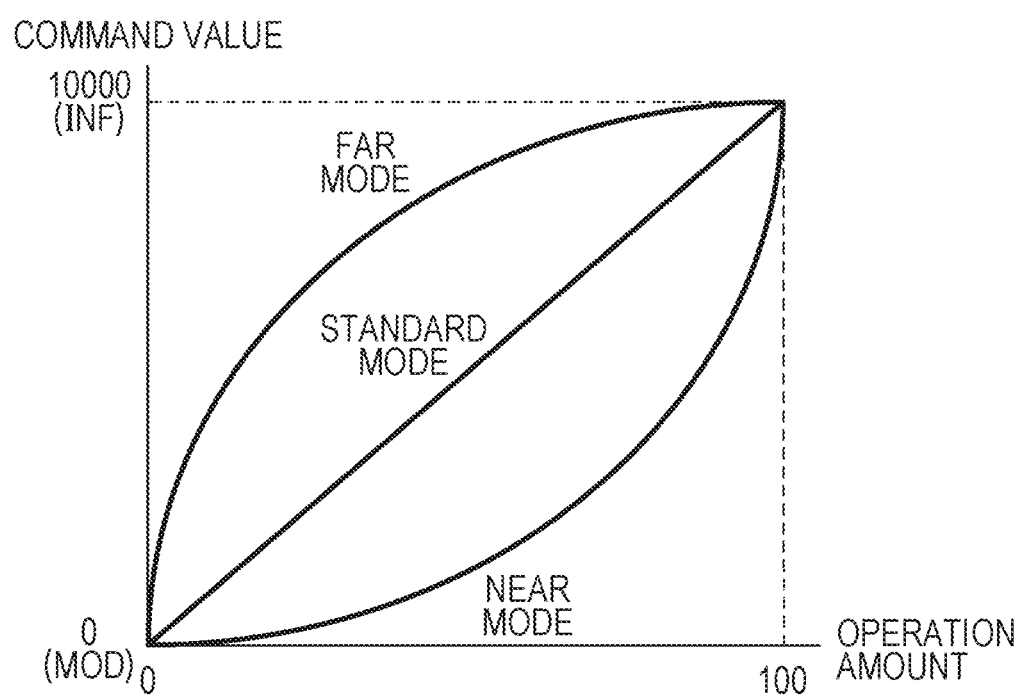
FIG. 2 illustrates an example of a relationship between an operation amount and a command value.

FIG. 2 illustrates an example of the relationship between the operation amount and the command value. In FIG. 2, the horizontal axis indicates the operation amount of the operation member 101, and the vertical axis indicates the command value generated by the command value generator 103. In this example, the operation amount is normalized with the value of the operation amount (e.g., angle of rotation) of the operation member 101 spread from 0 to 100. In addition, the command value is normalized with the value of the command value spread from 0 to 10000, in which the minimum object distance (MOD) is set to 0 and the infinity (INF) is set to 10000. In this example, three relationships are illustrated. A first relationship is a relationship in a standard mode. In the first relationship, the command value is in proportion to the operation amount. A second relationship is a relationship in a near mode. In the second relationship, the command value is not in proportion to the operation amount to facilitate the focus adjustment at an object distance close to the minimum object distance, and the slope of the curve representing the stated relationship is smaller as the object distance is closer to the minimum object distance. A third relationship is a relationship in a far mode. In the third relationship, the command value is not in proportion to the operation amount to facilitate the focus adjustment at an object distance close to the infinity, and the slope of the curve representing the stated relationship is smaller as the object distance is closer to the infinity. It is to be noted that the relationship between the operation amount and the command value is not limited to these examples, and various other relationships may also be employed in accordance with the intended use.

Figure 3:
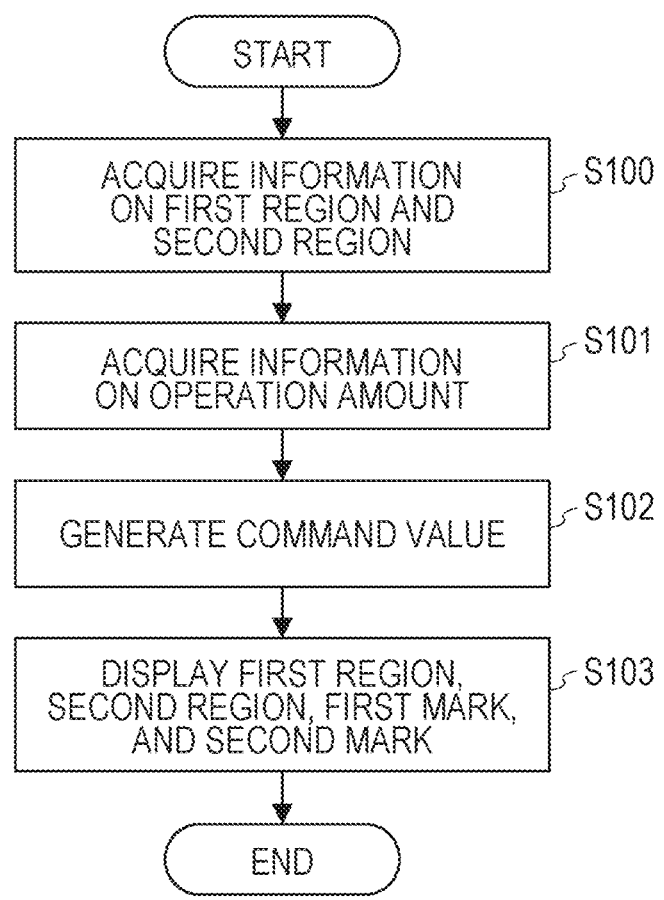
FIG. 3 illustrates an example of a processing flow in an operation device.

FIG. 3 illustrates an example of a processing flow in the operation device. This flow applies to a case in which the operation device 10 adopts a state, or mode, in which the relationship between the operation amount and the command value is displayed in the display 106, for example. First, in step S100, the command value generator 103 acquires, or obtains, from the storage unit 105, the information on the first region corresponding to the range of values of the command value and the information on the second region corresponding to the range of values of the operation amount. In step S101, the command value generator 103 acquires the information on the operation amount from the operation amount detector 102. In step S102, the command value generator 103 generates the command value on the basis of the acquired operation amount. In step S103, the command value generator 103 causes the display 106 to display the first region and the second region on each of which the information has been acquired. In addition, in step S103, the command value generator 103 causes the display 106 to display a first mark indicating the generated command value associated with the first region and a second mark indicating the operation amount on which the information has been acquired associated with the second region. This processing makes it possible to sensuously (e.g., visually) present, to the user, the relationship between the operation amount and the command value in an easily recognizable manner.

Figure 4A:
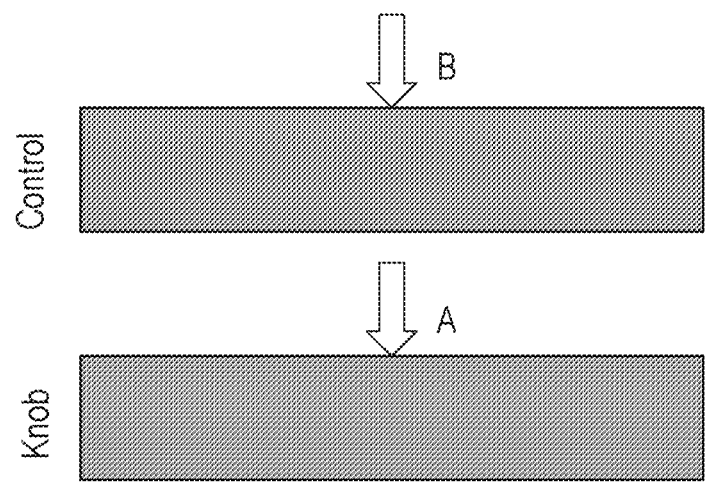
FIGS. 4A and 4B illustrate a display example (standard mode) in a display.
Figure 4B:
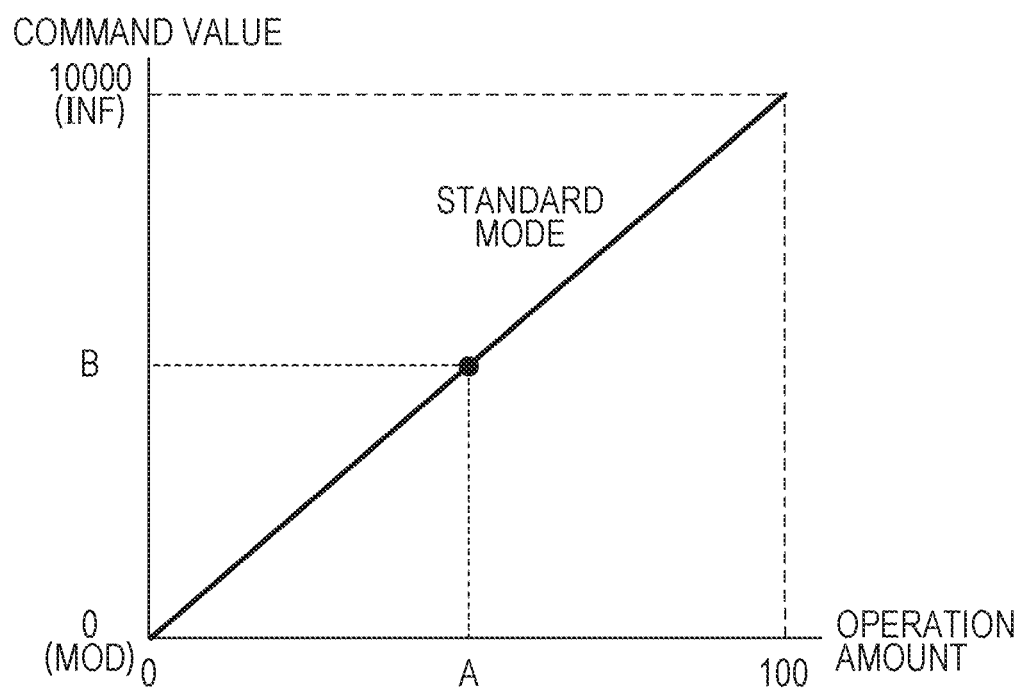
Figure 5A:
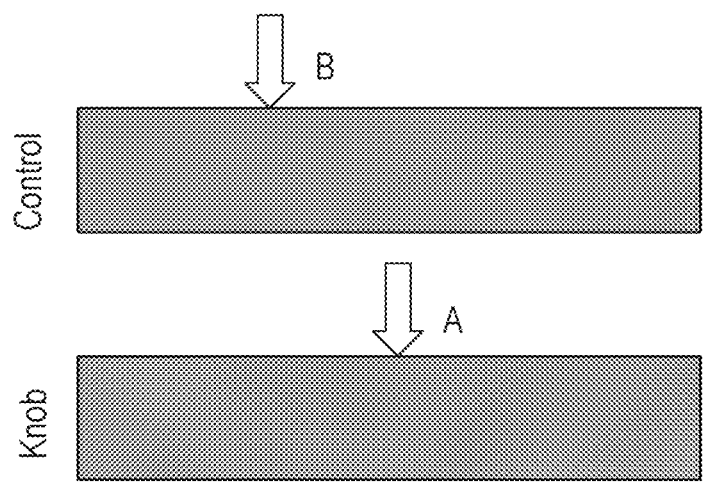
FIGS. 5A and 5B illustrate a display example (near mode) in a display.
Figure 5B:
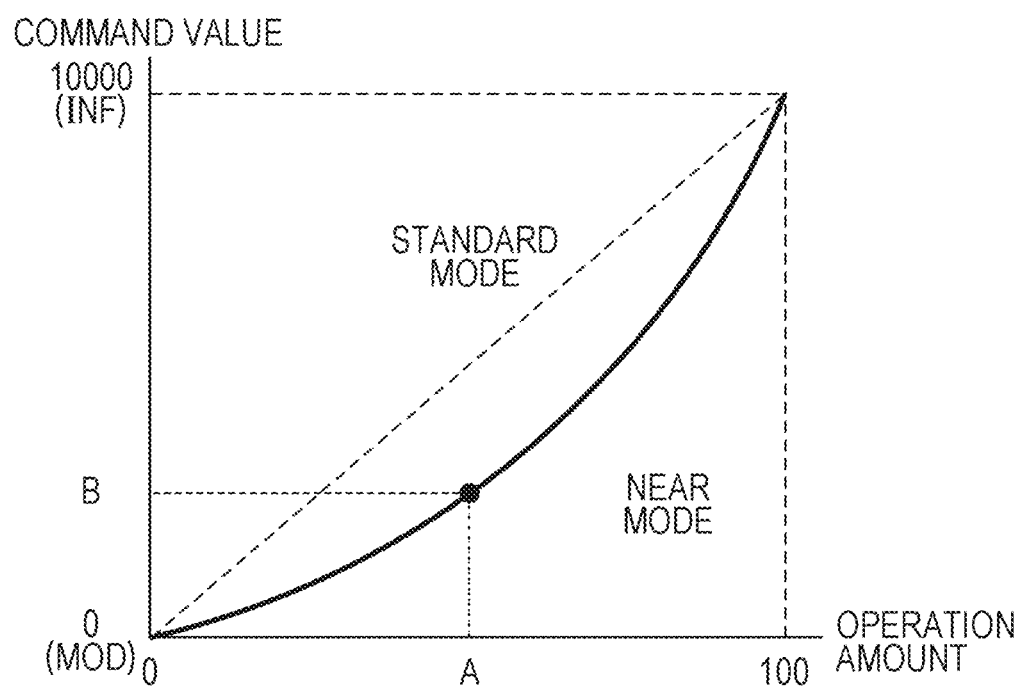
Figure 6A:
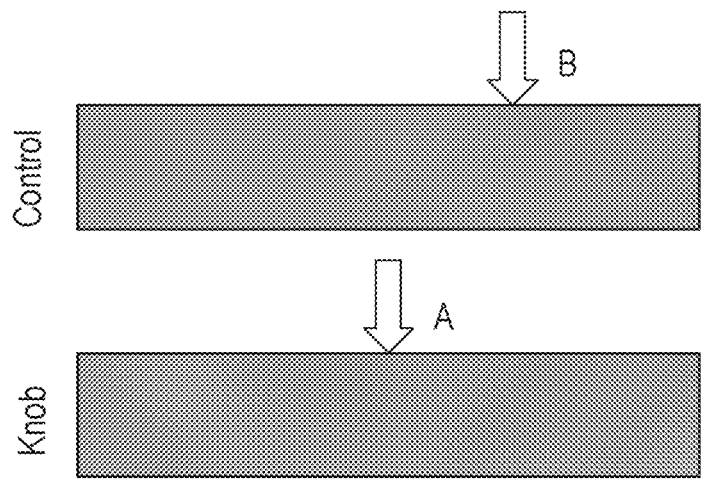
FIGS. 6A and 6B illustrate a display example (far mode) in a display.
Figure 6B:
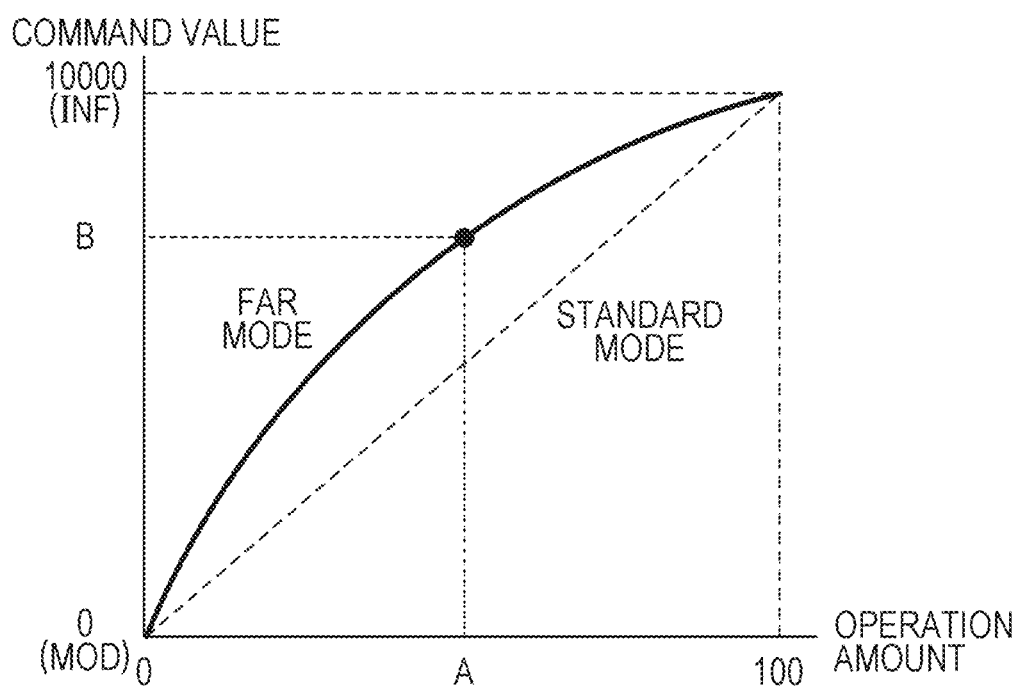

FIGS. 4A and 4B illustrate a display example for the standard mode in the display, FIGS. 5A and 5B illustrate a display example for the near mode in the display, and FIGS. 6A and 6B illustrate a display example for the far mode in the display. In each of FIGS. 4A, 5A, and 6A, the upper band indicates the first region corresponding to the range of values of the command value, and the lower band indicates the second region corresponding to the range of values of the operation amount. The command value generator 103 causes the display 106 to display the first region and the second region in such a manner that the first region and the second region are parallel to each other in the lengthwise, or longitudinal, direction and that the first region and the second region are aligned with each other in the lengthwise direction (e.g., their lengthwise ends are aligned with each other). In addition, the command value generator 103 causes the display 106 to display the first region and the second region in such a manner that the first region and the second region have an equal length in the lengthwise direction. The upper arrow corresponding to a first mark indicates the generated command value associated with the first region, and the lower arrow corresponding to a second mark indicates the acquired operation amount associated with the second region. In each band, the left end corresponds to the minimum object distance, and the right end corresponds to the infinity. In addition, each of FIGS. 4B, 5B, and 6B illustrates the relationship between the operation amount and the command value in its assigned mode. When the operation amount is A, the command value is B. In FIGS. 4A to 6B, the operation amount A and the command value B in FIGS. 4A, 5A, and 6A correspond to the operation amount A and the command value B in FIGS. 4B, 5B, and 6B, respectively. In the following, the first mark corresponds to the command value B and the second mark corresponds to the operation amount A.

In the standard mode illustrated in FIGS. 4A and 4B, the slope of the curve representing the relationship between the operation amount and the command value is constant; therefore, the operation resolution is constant. In the near mode illustrated in FIGS. 5A and 5B, the slope of the curve representing the relationship is smaller as the object distance is closer to the minimum object distance; therefore, the operation resolution is high. In the far mode illustrated in FIGS. 6A and 6B, the slope of the curve representing the relationship is smaller as the object distance is closer to the infinity; therefore, the operation resolution is high. Accordingly, in the standard mode, the first mark constantly indicates the same position, in the right-left direction in this example, as the second mark regardless of the object distance. In addition, in the near mode, the first mark is closer than the second mark to the minimum object distance. It is to be noted that, in the near mode, the first mark indicates the same position as the second mark at the minimum object distance and at the infinity. In the far mode, the first mark is closer than the second mark to the infinity. It is to be noted that, in the far mode, the first mark indicates the same position as the second mark at the minimum object distance and at the infinity.

As described thus far, according to the present exemplary embodiment, the relationship between the operation amount and the command value can be displayed in a manner that allows the user to recognize with ease. Accordingly, the operation device that is advantageous in terms of the operability of the operation member can be provided, for example.

Second Exemplary Embodiment

Figure 7:
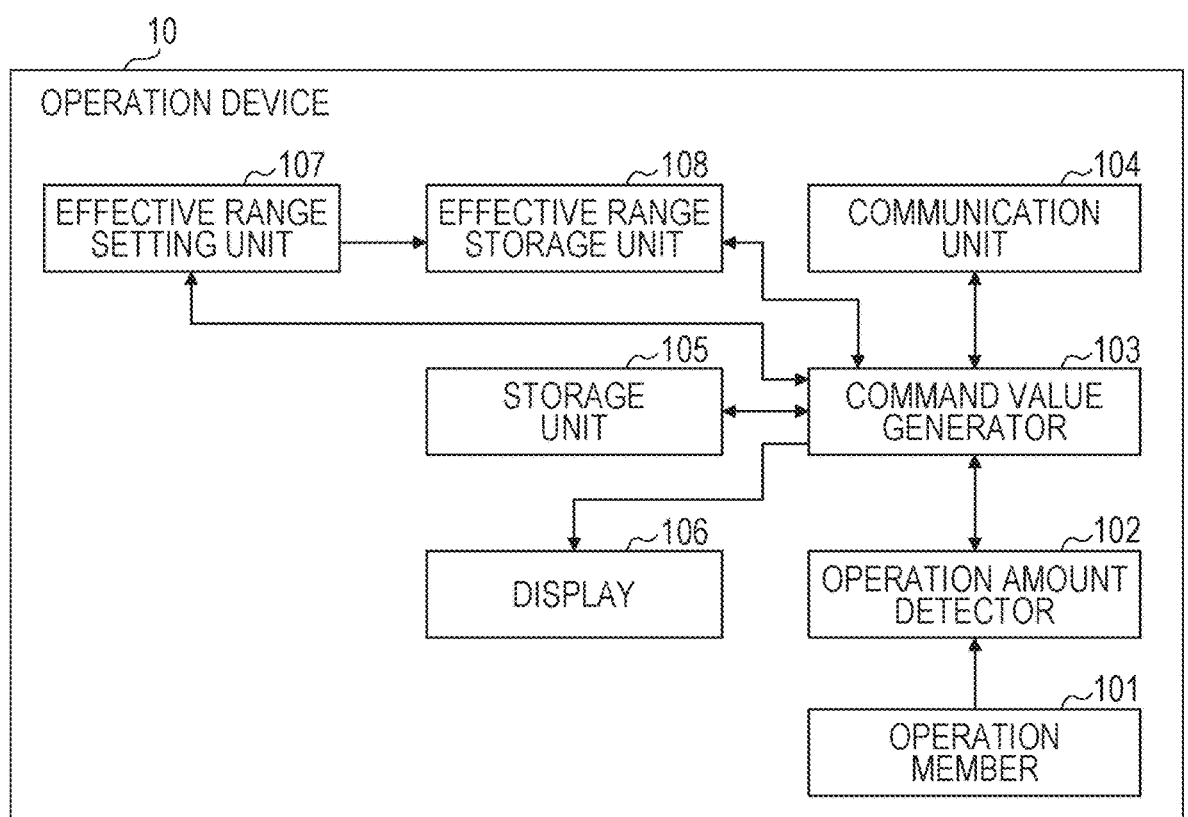
FIG. 7 illustrates a configuration example of an operation device according to a second exemplary embodiment.

A second exemplary embodiment will be described with reference to FIG. 7 to FIG. 16. FIG. 7 illustrates a configuration example of an operation device according to the second exemplary embodiment. FIG. 7 illustrates a configuration example in which an effective range setting unit 107 and an effective range storage unit 108 are added to the configuration example illustrated in FIG. 1. The effective range setting unit 107 can set an effective range for each of the command value with respect to the focus lens and the operation amount of the operation member 101. The effective range storage unit 108 stores each effective range set by the effective range setting unit 107. The information on each effective range may be read out in response to a request from the command value generator 103 (controller). It is to be noted that the effective range may be set herein for only one of the command value and the operation amount. In addition, the storage unit 105 and the effective range storage unit 108 may be configured integrally as a single storage unit.

Figure 8:
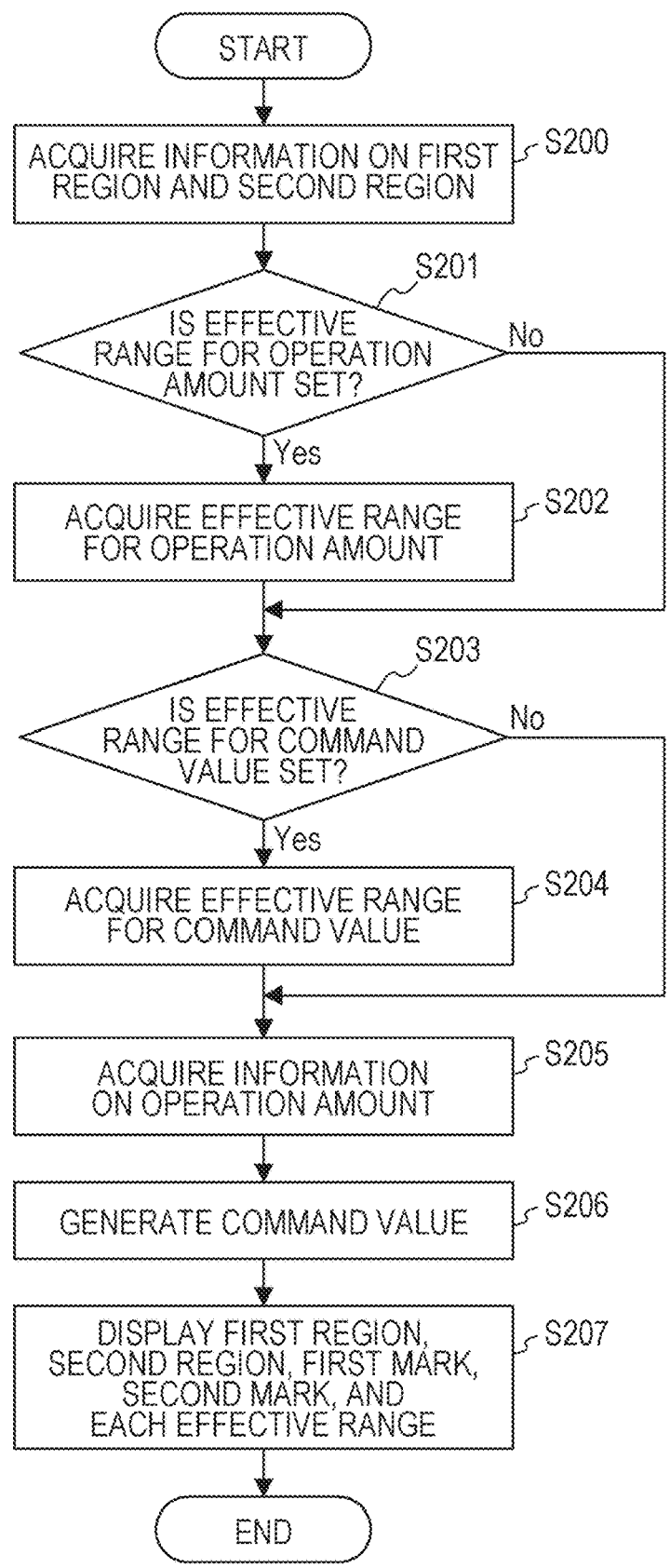
FIG. 8 illustrates an example of a processing flow in an operation device.

FIG. 8 illustrates an example of a processing flow in the operation device. This flow applies to a case in which the operation device 10 adopts a state or mode in which the relationship between the operation amount and the command value is displayed in the display 106, for example. First, in step S200, as in the first exemplary embodiment, the command value generator 103 acquires, from the storage unit 105, the information on the first region corresponding to the range of values of the command value and the information on the second region corresponding to the range of values of the operation amount. In step S201, the command value generator or controller 103 determines whether the effective range for the operation amount is stored or set in the effective range storage unit 108. If the effective range is stored, the processing proceeds to step S202. If the effective range is not stored, the processing proceeds to step S203. In step S202, the command value generator 103 retrieves the information on the effective range for the operation amount stored in the effective range storage unit 108 and sets the effective range for the operation amount. In step S203, the command value generator 103 determines whether the effective range for the command value is set in the effective range storage unit 108. If the effective range is set, the processing proceeds to step S204. If the effective range is not set, the processing proceeds to step S205. In step S204, the command value generator 103 retrieves the effective range for the command value stored in the effective range storage unit 108 and sets the effective range for the command value.

In step S205, the command value generator 103 acquires the information on the operation amount from the operation amount detector 102. In step S206, the command value generator 103 generates the command value on the basis of the acquired operation amount. In step S207, the command value generator 103 causes the display 106 to display the first mark indicating the generated command value associated with the first region and the second mark indicating the operation amount on which the information has been acquired associated with the second region. Furthermore, the command value generator 103 causes the display 106 to display the information on the set effective ranges associated with the first region and the second region. This processing makes it possible to sensuously (e.g., visually) present, to the user, not only the relationship between the operation amount and the command value but also the effective range for at least one of the operation amount and the command value that is set in an easily recognizable manner.

Figure 9A:
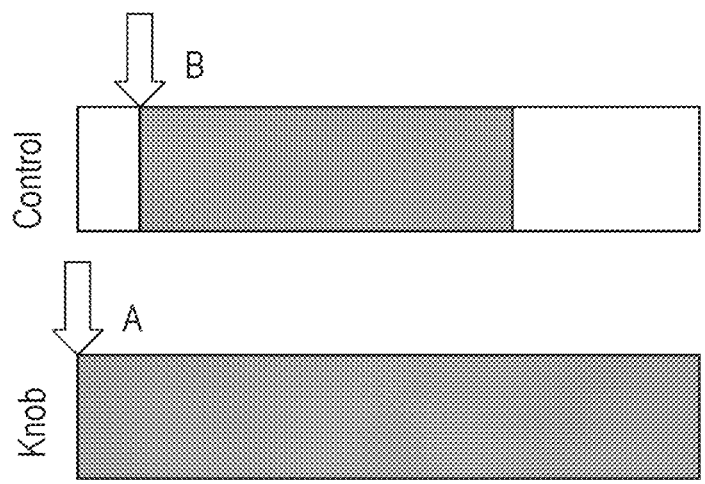
FIGS. 9A and 9B illustrate a display example (case of command value limiting mode) in a display.
Figure 9B:
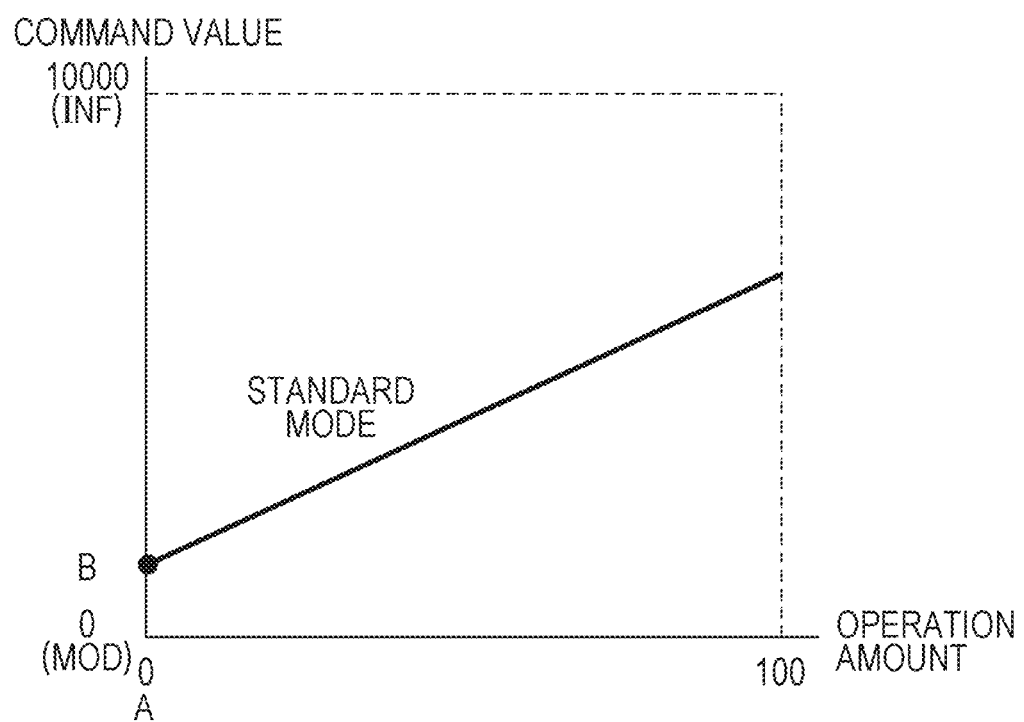
Figure 10A:
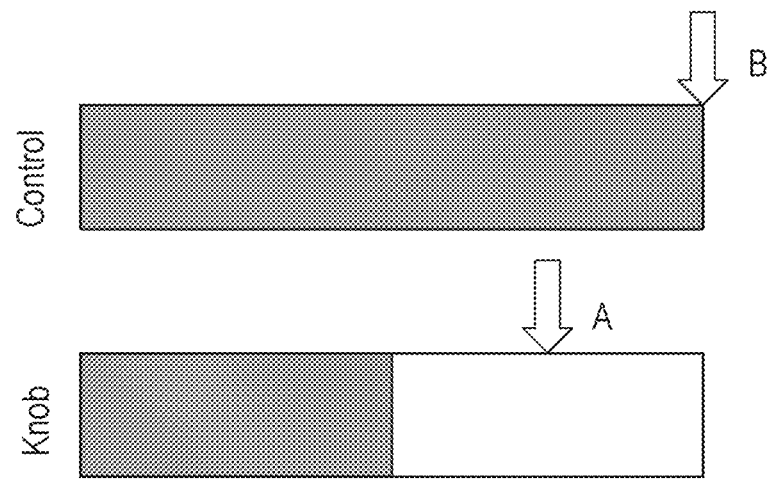
FIGS. 10A and 10B illustrate a display example (case of operation amount limiting mode) in a display.
Figure 10B:
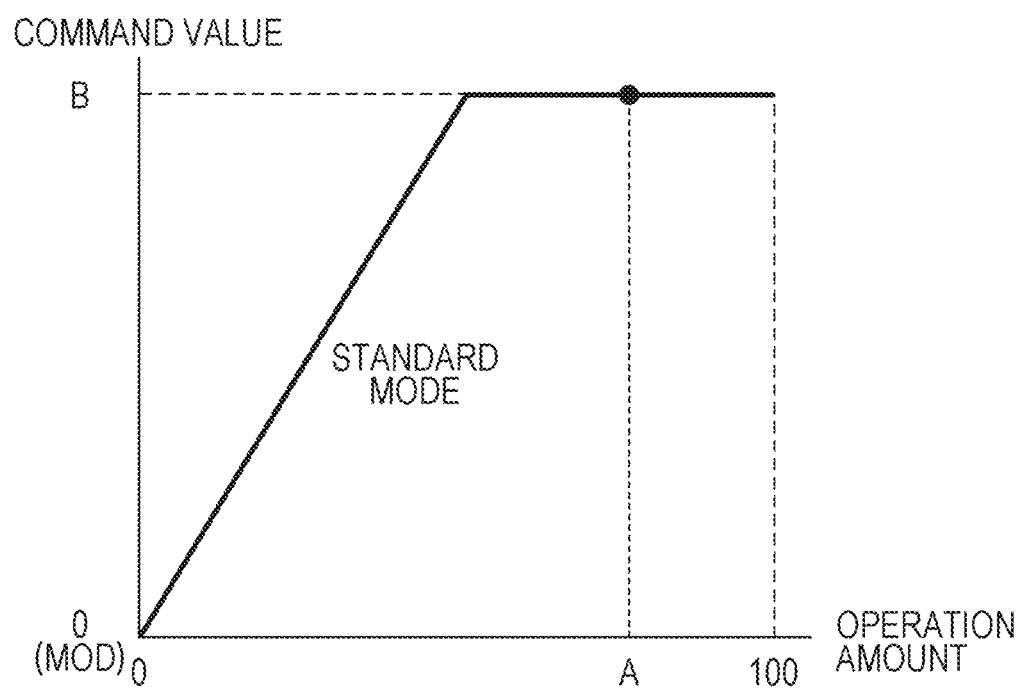

FIGS. 9A and 9B illustrate a display example for the case of command value limiting mode in the display. In addition, FIGS. 10A and 10B illustrate a display example for the case of operation amount limiting mode in the display. In each of FIGS. 9A and 10A, in addition to the mode of the display example according to the first exemplary embodiment, the effective range is indicated by a marking section, marked in black in this example, within the band, which conversely indicates that an ineffective range is indicated by a non-marking section. FIGS. 9A and 9B illustrate a display example obtained in a case in which the command value is generated in accordance with the standard mode and the effective range is set for the command value. FIGS. 10A and 10B illustrate a display example obtained in a case in which the command value is generated in accordance with the standard mode and the effective range is set for the operation amount.

In the display example illustrated in FIGS. 9A and 9B, since the effective range is set for the command value, when the operation amount A is at a physical or mechanical left end (0), the command value B is at the left end of the effective range. In the display example illustrated in FIGS. 10A and 10B, since the effective range is set for the operation amount, when the operation amount A is at the right end of the effective range, the command value B is at a physical right end, and the command value B remains at the physical right end even if the operation amount A goes beyond the right end of the effective range.

Figure 11:
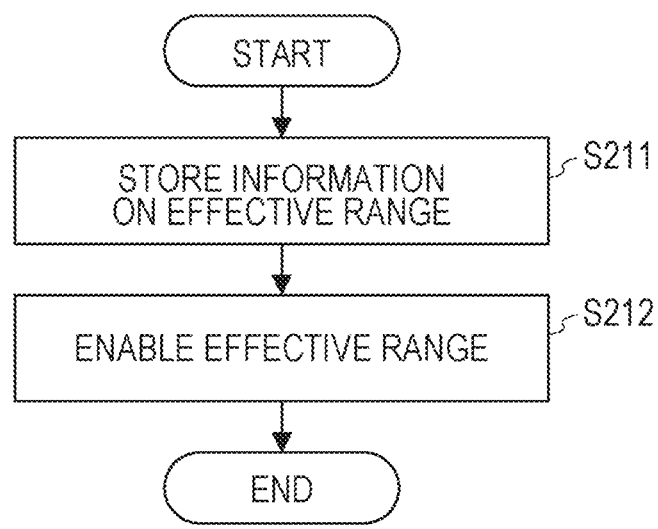
FIG. 11 illustrates an example of a processing flow for setting an effective range.
Figure 12:
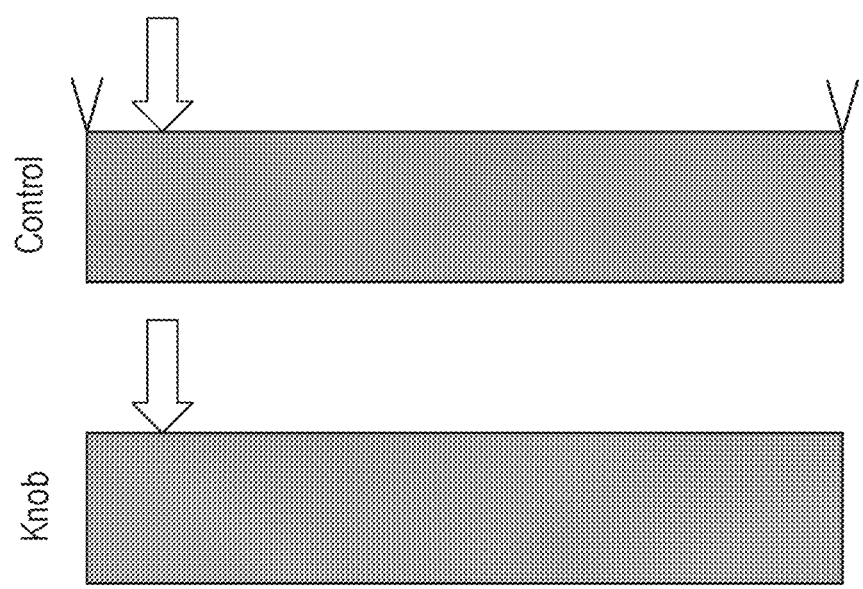
FIG. 12 illustrates a display example pertaining to the setting of the effective range.
Figure 13:
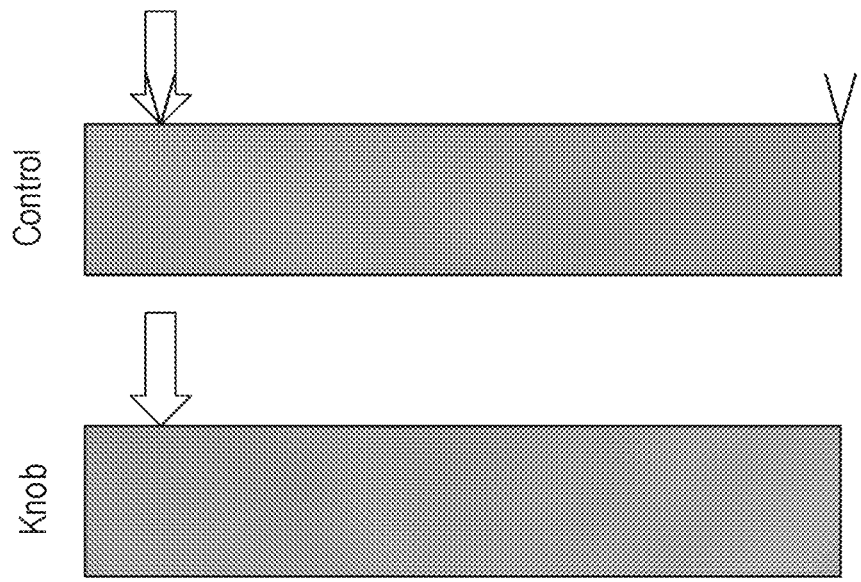
FIG. 13 illustrates a display example pertaining to the setting of the effective range.
Figure 14:
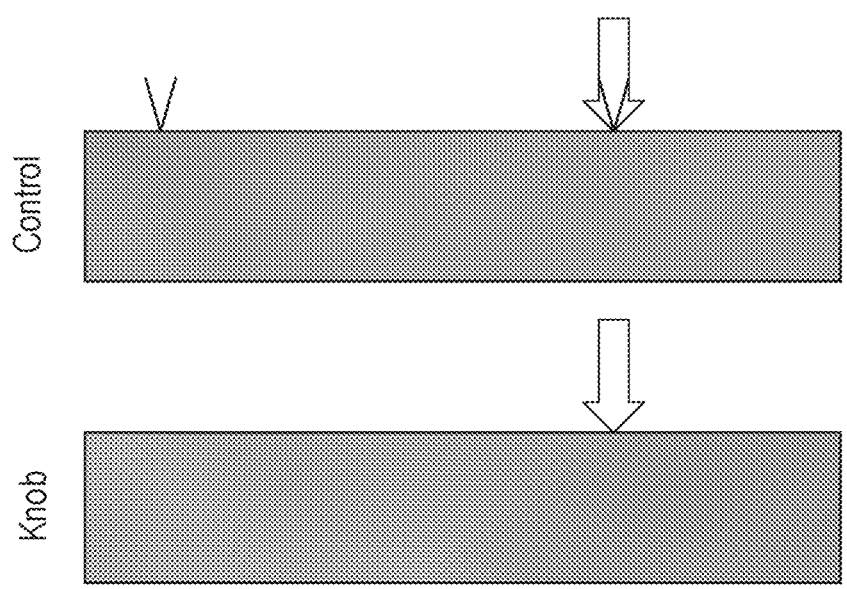
FIG. 14 illustrates a display example pertaining to the setting of the effective range.
Figure 15:
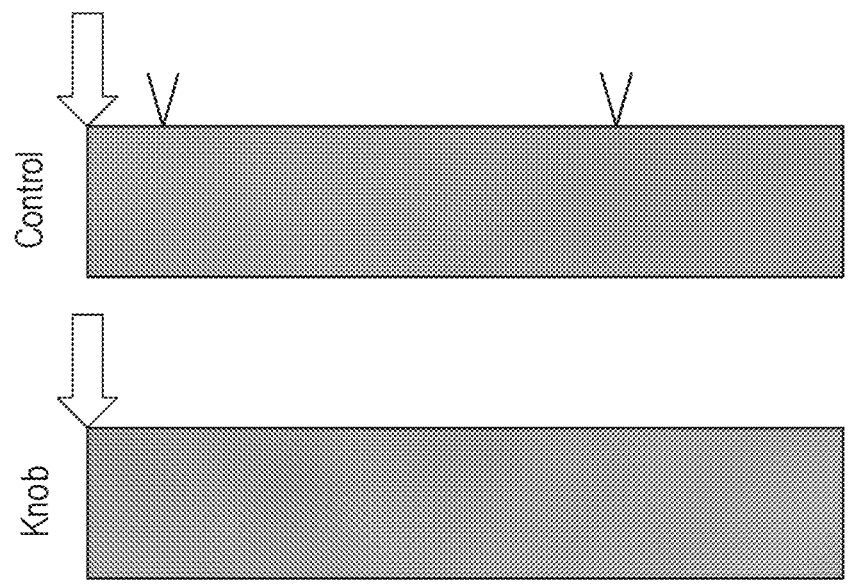
FIG. 15 illustrates a display example pertaining to the setting of the effective range.

FIG. 11 illustrates an example of a processing flow for setting the effective range. In addition, FIG. 12 to FIG. 15 each illustrate a display example pertaining to the setting of the effective range. FIG. 12 is a display example of an initial state in the setting of the effective range, and the V-shaped marks (effective range marks) indicate the current effective range. First, in step S211, the command value generator or controller 103 moves the effective range marks, as illustrated in FIGS. 13 and 14, in accordance with a user instruction received via the effective range setting unit 107 and stores information on the effective range into the effective range storage unit 108. For example, each effective range mark may be programmed to move successively in response to the movement of the arrow (the first mark or the second mark) associated with the operation of the operation member 101. In order to move each effective range mark and to set the effective range, the effective range setting unit 107 may include, in place of or in addition to the operation member 101, a well-known input device to be operated by the user. After the effective range is stored, the state of the effective range marks displayed in the display 106 does not change, as illustrated in FIG. 15, even if the operation member 101 or another input device is operated.

Figure 16:
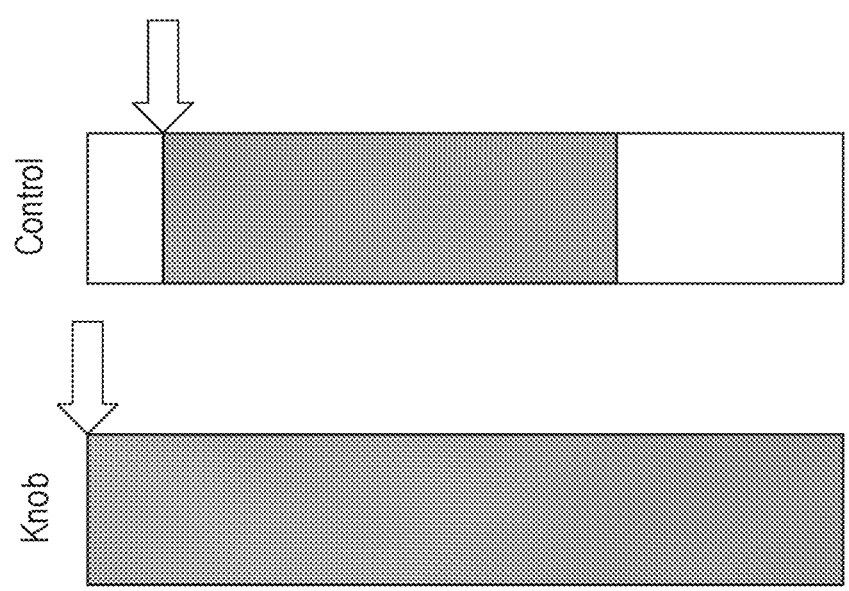
FIG. 16 illustrates a display example obtained in a case in which an effective range is set.

In step S212, the command value generator 103 enables the effective range stored in the effective range storage unit 108. FIG. 16 illustrates a display example obtained in a case in which the effective range is set. In this example, since the effective range for the command value is limited, a method, function or table for generating or calculating the command value and the mode of displaying the first mark differ from those held before the limitation or setting in accordance with the content of the limitation or setting. In addition, in a case in which the effective range for the operation amount is to be limited or set or the effective range for each of the command value and the operation amount is to be limited or set, similar processing and display that conform to the case may be carried out.

As described thus far, according to the present exemplary embodiment, the relationship between the operation amount and the command value can be displayed along with the effective range for at least one of the operation amount and the command value in a manner that allows the user to recognize with ease. Accordingly, the operation device that is advantageous in terms of the operability of the operation member can be provided, for example.

Third Exemplary Embodiment

Figure 17:
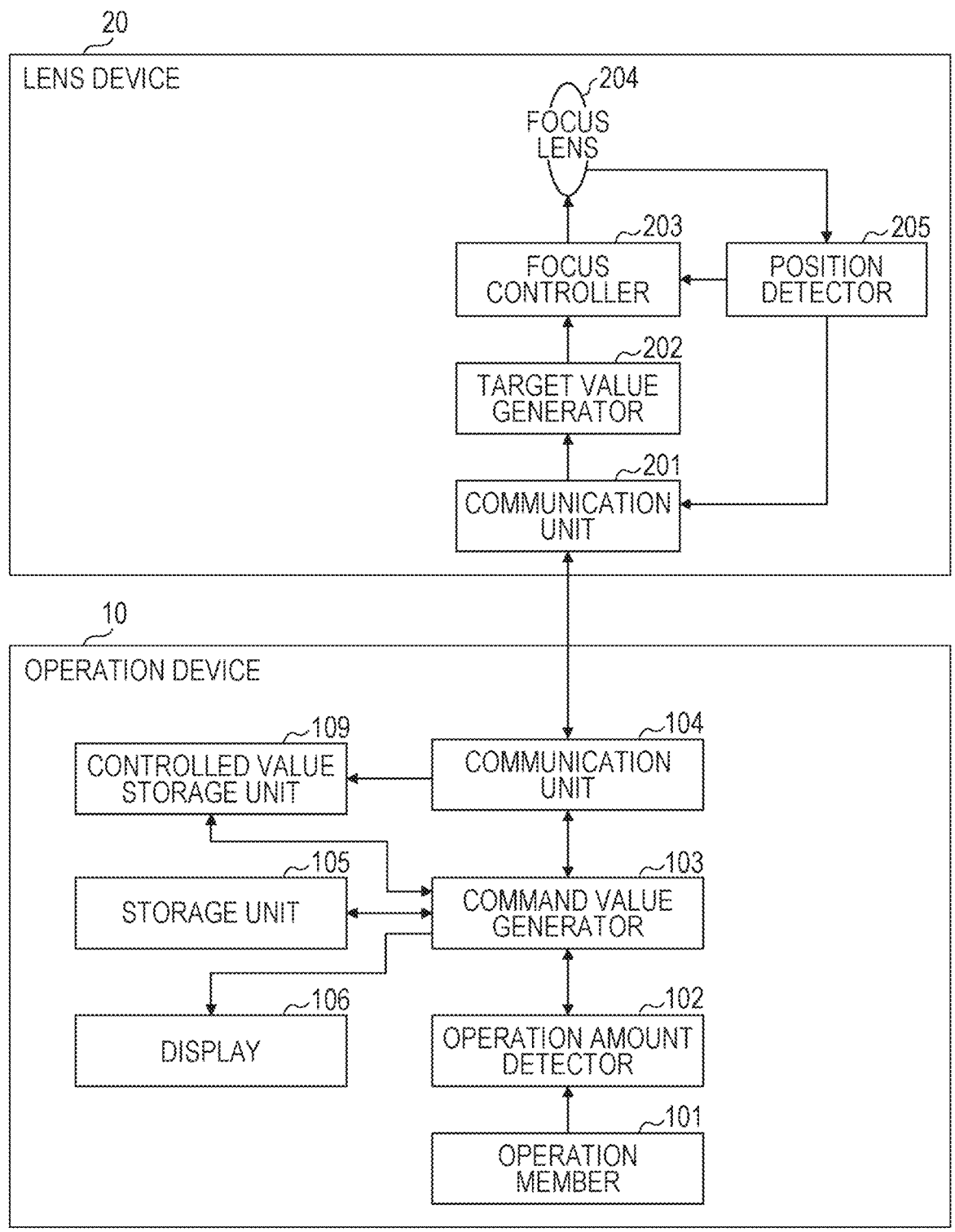
FIG. 17 illustrates a configuration example of an operation device according to a third exemplary embodiment.

A third exemplary embodiment will be described with reference to FIG. 17 to FIG. 19. FIG. 17 illustrates a configuration example of an operation device according to the third exemplary embodiment. In FIG. 17, the operation device 10 is connected to a lens device 20. The operation device 10 includes, in addition to the configuration of the operation device 10 according to the first exemplary embodiment, a controlled value storage unit 109. The controlled value storage unit 109 and the storage unit 105 may be configured integrally as a single storage unit.

In FIG. 17, a communication unit 201 is provided within the lens device 20 and communicates with the communication unit 104 of the operation device 10 regarding information on a command and so on. When the communication unit 201 receives the information on the command including the command value from the communication unit 104, the communication unit 201 decodes the received information and transmits the decoded information to a target value generator 202. Then, the target value generator 202 generates a target value on the basis of the command value and transmits the generated target value to a focus controller 203. The focus controller 203 then controls the position of a focus lens 204 on the basis of the received target value. A position detector 205 detects the position of the focus lens 204 and may include a well-known position sensor, such as a potentiometer or an encoder. A signal indicating the position or the controlled value detected by the position detector 205 is fed back to the focus controller 203. The focus controller 203 carries out feedback control on the focus lens 204 on the basis of the controlled value fed back from the position detector 205. In addition, the communication unit 201 has a function of transmitting the position or the controlled value of the focus lens 204 detected by the position detector 205 to the communication unit 104 of the operation device 10.

The command value generator or controller 103 acquires the position or the controlled value of the focus lens 204 from the communication unit 201 of the lens device 20 via the communication unit 104 of the operation device 10. The position or the controlled value of the focus lens 204 obtained via the communication unit 104 is stored into the controlled value storage unit 109. Thus, the command value generator 103 can acquire the controlled value from the controlled value storage unit 109 as necessary.

Figure 18:
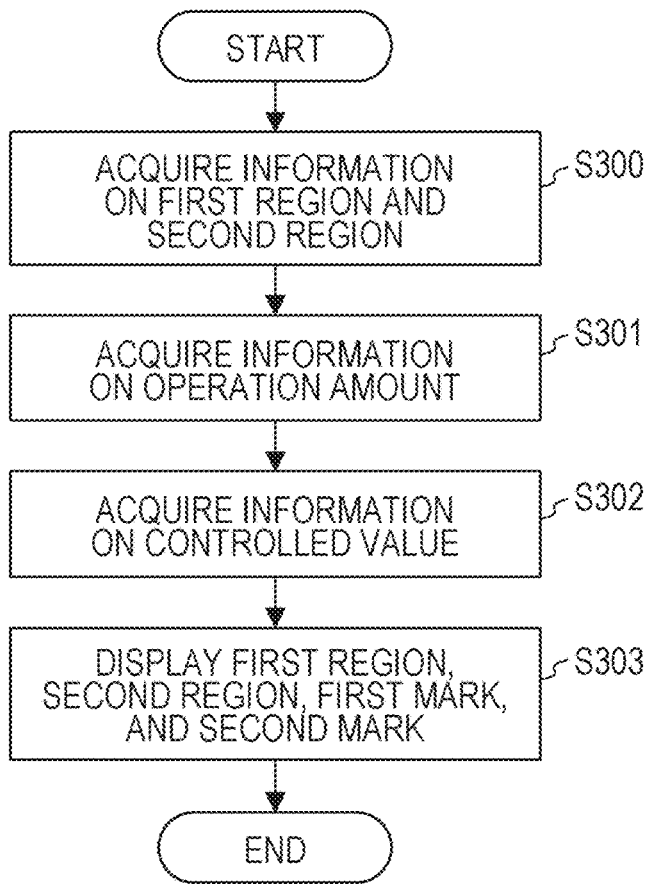
FIG. 18 illustrates an example of a processing flow in an operation device.

FIG. 18 illustrates an example of a processing flow in the operation device. This flow applies to a case in which the operation device 10 adopts a state or mode in which the relationship between the operation amount and the command value is displayed in the display 106, for example. First, in step S300, as in the first exemplary embodiment, the command value generator 103 acquires, from the storage unit 105, the information on the first region corresponding to the range of values of the command value and the information on the second region corresponding to the range of values of the operation amount. In step S301, the command value generator 103 acquires the information on the operation amount from the operation amount detector 102. In step S302, the command value generator 103 acquires the information on the position or the controlled value of the focus lens 204 in the lens device 20 from the controlled value storage unit 109. In step S303, the command value generator 103 causes the display 106 to display the first region and the second region on each of which the information has been acquired. In addition, in step S303, the command value generator 103 causes the display 106 to display the first mark indicating the controlled value on which the information has been acquired associated with the first region and the second mark indicating the operation amount on which the information has been acquired associated with the second region. This processing makes it possible to sensuously (e.g., visually) present, to the user, the relationship between the operation amount and the controlled value in an easily recognizable manner.

Figure 19:
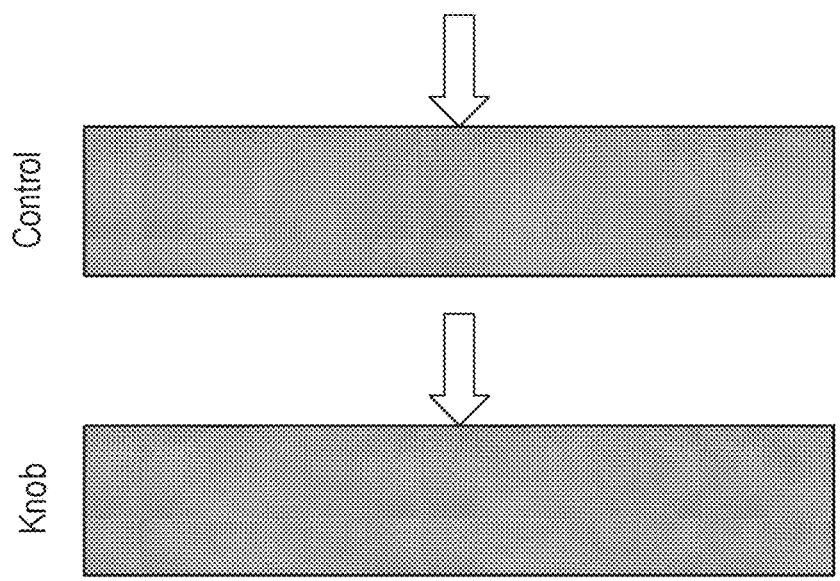
FIG. 19 illustrates a display example (standard mode) in a display.

FIG. 19 illustrates a display example for the standard mode in the display. In FIG. 19, the upper band indicates the first region corresponding to the range of values of the controlled value, and the lower band indicates the second region corresponding to the range of values of the operation amount. The upper arrow corresponding to a first mark indicates the acquired controlled value associated with the first region, and the lower arrow corresponding to a second mark indicates the acquired operation amount associated with the second region. In each band, the left end corresponds to the minimum object distance, and the right end corresponds to the infinity. In the upper band, the position indicated by the arrow (first mark) corresponds to the controlled value obtained as a result of the focus lens 204 following the command value generated by the command value generator 103 and may thus be different from that in the first exemplary embodiment in accordance with a control deviation.

As described thus far, according to the present exemplary embodiment, the relationship between the operation amount and the controlled value can be displayed in a manner that allows the user to recognize with ease. Accordingly, the operation device that is advantageous in terms of the operability of the operation member can be provided, for example.

Fourth Exemplary Embodiment

Figure 20:
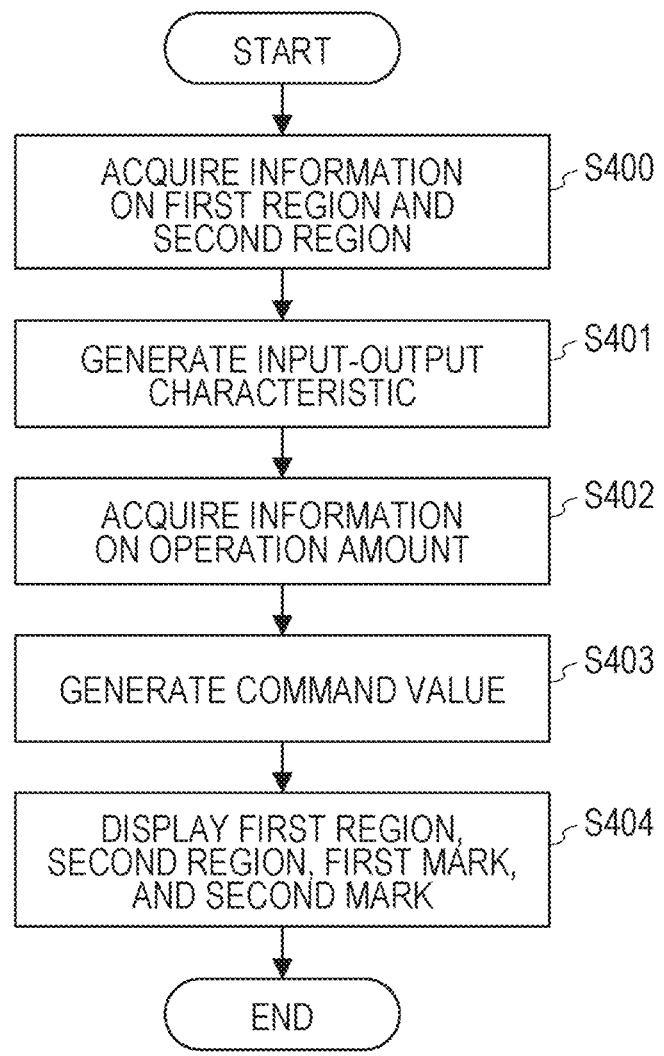
FIG. 20 illustrates an example of a processing flow according to a fourth exemplary embodiment.

A fourth exemplary embodiment will be described with reference to FIG. 20 to FIG. 22. The configuration example of the operation device 10 according to the fourth exemplary embodiment may be similar to that of the second exemplary embodiment. The fourth exemplary embodiment differs from the second exemplary embodiment in that a characteristic (e.g., input-output characteristic or relationship) between the operation amount (input) and the command value or the controlled value (output) is displayed with the use of a coordinate system (e.g., two-dimensional orthogonal coordinate system). FIG. 20 illustrates an example of a processing flow in the operation device. This flow applies to a case in which the operation device 10 adopts a state (mode) in which the relationship between the operation amount and the command value is displayed in the display 106, for example. First, in step 400, as in the second exemplary embodiment, the command value generator 103 acquires, from the storage unit 105, the information on the first region corresponding to the range of values of the command value and the information on the second region corresponding to the range of values of the operation amount. In step S401, the command value generator 103 generates the characteristic between the operation amount and the command value on the basis of the information on the function or the table to be used to generate the command value and the information on the effective range stored in the effective range storage unit 108. In step S402, the command value generator 103 acquires the information on the operation amount from the operation amount detector 102. In step S403, the command value generator 103 generates the command value on the basis of the acquired operation amount. In step S404, the command value generator 103 causes the display 106 to display the generated characteristic (i.e., the characteristic curve representing the generated characteristic) with the first region on which the information has been acquired plotted along the vertical axis of the graph (vertical coordinate axis) and the second region on which the information has been acquired plotted along the horizontal axis of the graph (horizontal coordinate axis). In addition, in step S404, the command value generator 103 causes the display 106 to display the first mark indicating the generated command value associated with the first region and the second mark indicating the operation amount on which the information has been acquired associated with the second region. This processing makes it possible to sensuously (e.g., visually) present, to the user, the relationship between the operation amount and the command value in an easily recognizable manner. It is to be noted that the command value generator 103 causes the display 106 to display the first region and the second region in such a manner that the first region and the second region have an equal length in the lengthwise direction. An example in which a two-dimensional orthogonal coordinate system is employed as a coordinate system has been illustrated. Alternatively, any other coordinate system such as a two-dimensional oblique coordinate system or a two-dimensional polar coordinate system may also be employed.

Figure 21:
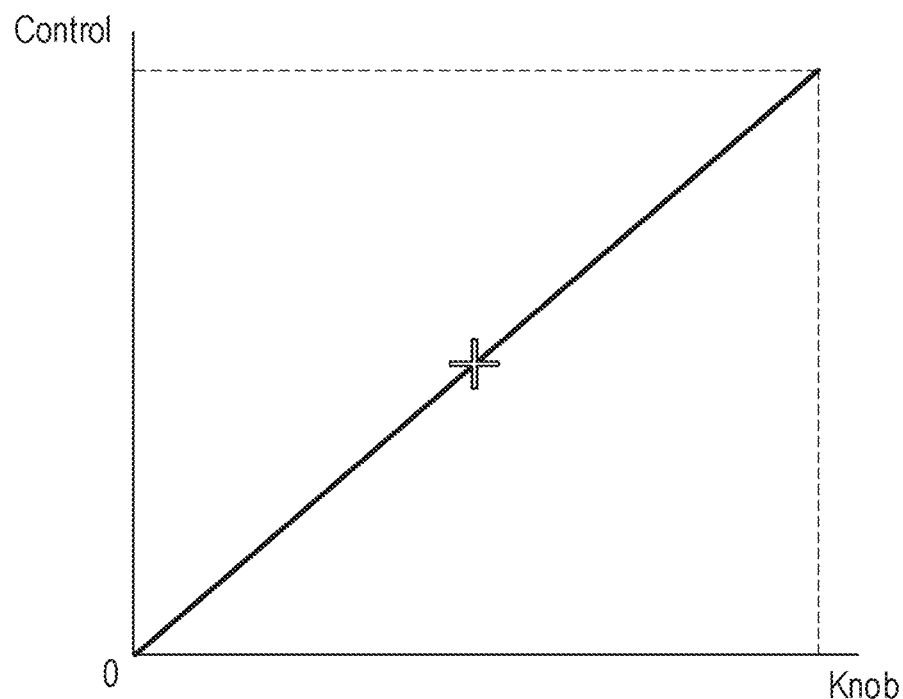
FIG. 21 illustrates a display example (case of standard mode) in a display.
Figure 22:
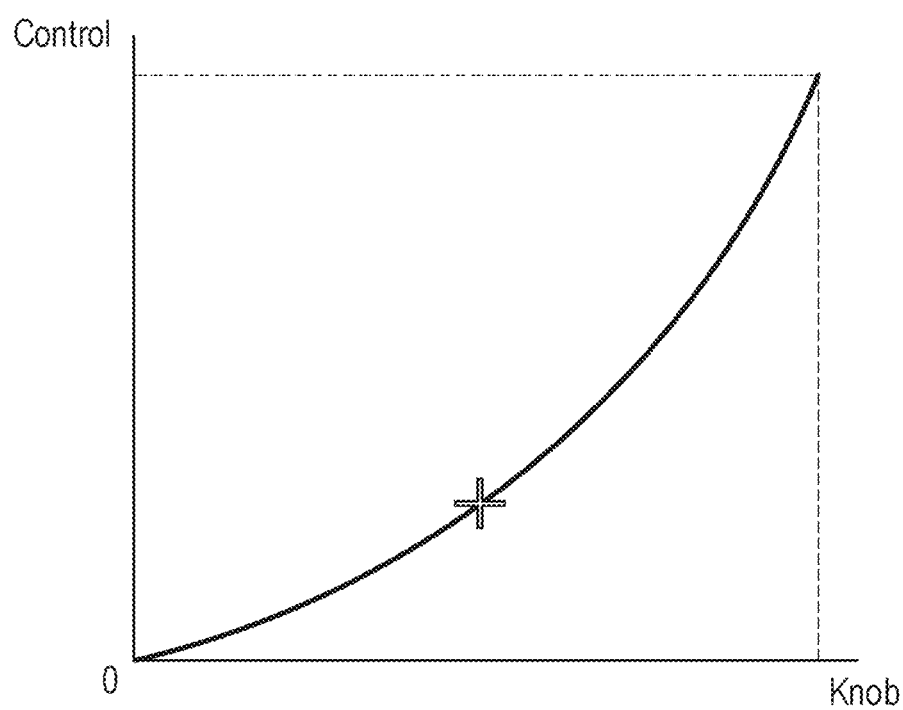
FIG. 22 illustrates a display example (case of near mode) in a display.

FIG. 21 illustrates a display example for the case of standard mode in the display. In addition, FIG. 22 illustrates a display example for the case of near mode in the display. In each of FIGS. 21 and 22, the effective range may be indicated by a marking section with respect to each axis, instead of on each band as in the second exemplary embodiment, which conversely indicates that an ineffective range may be indicated by a non-marking section. FIG. 21 illustrates a display example obtained in a case in which the command value is generated in accordance with the standard mode. In the display example illustrated in FIG. 21, displayed on the aforementioned characteristic (i.e., on the characteristic curve) is a third mark (e.g., a cross mark) that is indicated by the first mark plotted as a value (coordinate) on the vertical axis and the second mark plotted as a value (coordinate) on the horizontal axis. FIG. 22 illustrates a display example obtained in a case in which the command value is generated in accordance with the near mode. In either of the cases illustrated in FIGS. 21 and 22, movement of the third mark on the characteristic or the characteristic curve in accordance with the operation of the operation member 101 makes it possible to sensuously (e.g., visually) present, to the user, the relationship between the operation amount and the command value in an easily recognizable manner. Although not illustrated, the display obtained in a case in which the command value is generated in accordance with the far mode may be similar to those illustrated in FIGS. 21 and 22.

As described thus far, according to the present exemplary embodiment, the relationship between the operation amount and the controlled value can be displayed with the use of a coordinate system in a manner that allows the user to recognize with ease. Accordingly, the operation device that is advantageous in terms of the operability of the operation member can be provided, for example.

Exemplary Embodiment of Imaging Apparatus

Figure 24:
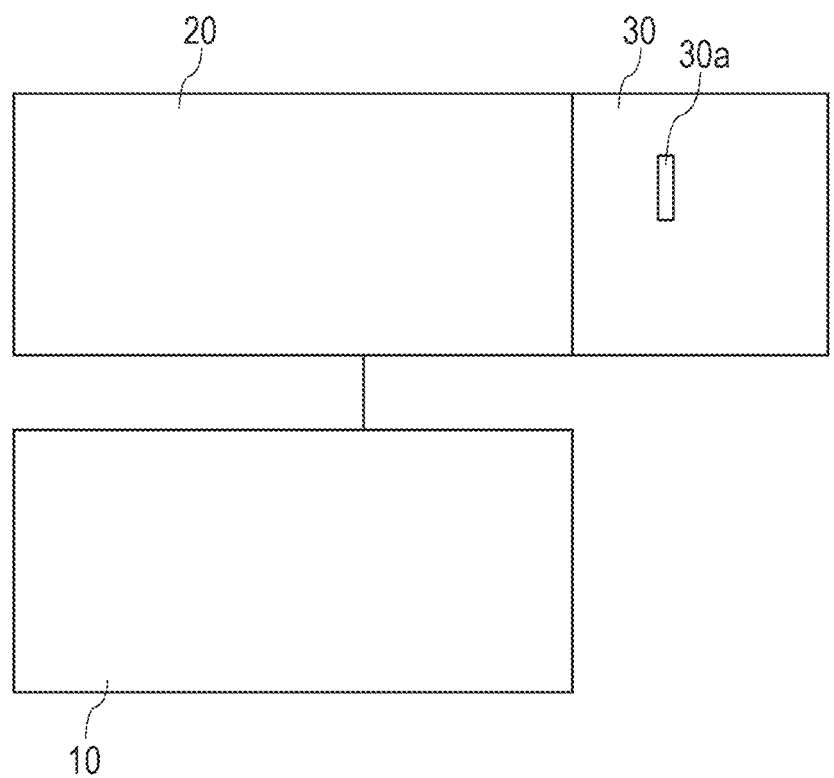
FIG. 24 illustrates a configuration example of an imaging apparatus.

FIG. 24 illustrates a configuration example of an imaging apparatus. The imaging apparatus includes the operation device 10 illustrated above, the optical apparatus (e.g., lens device) 20, and a camera device or imager 30 having an image sensor 30a configured to receive light (e.g., optical image) from the optical apparatus 20. With the imaging apparatus according to the present exemplary embodiment, the imaging apparatus that is advantageous in terms of the operability of the operation member can be provided, for example.

Thus far, exemplary embodiments of the disclosure have been described, but the disclosure is not limited to these exemplary embodiments, and various modifications and changes can be made within the scope of spirit of the disclosure. For example, in the foregoing examples, a movable lens (e.g., focus lens) for changing the object distance has been illustrated as an example of a movable optical element for changing the optical characteristic of the optical apparatus. The optical element, however, is not limited thereto. For example, a movable lens for changing the focal length of the optical apparatus or a lens device (i.e., for changing the magnification) or a diaphragm member with a movable diaphragm blade for adjusting the F-value (F-number) or the effective aperture of the optical apparatus may also be employed. In addition, the display 106 may be disposed inside the lens device 20 or the camera device 30, instead of inside the operation device 10. When the display 106 is disposed inside the camera device 30, the display 106 may be at a viewfinder of the camera device 30.

Other Embodiments

Embodiment(s) of the disclosure can also be realized by a computer of a system or apparatus that reads out and executes computer executable instructions (e.g., one or more programs) recorded on a storage medium, which may also be referred to more fully as a 'non-transitory computer-readable storage medium' to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-138345 filed Jul. 14, 2017, which is hereby incorporated by reference herein in its entirety.

What is claimed is:

1. An operation device for performing control of a movable optical element to change an optical characteristic of an optical apparatus, the operation device comprising:
an operation member operating in a movable range;
a detector configured to detect an operation amount of the operation member; and
a controller configured to generate a command for the control based on the operation amount,
wherein the controller is configured to cause a display to display a first region, a first mark, a second region, and a second mark, the first region corresponding to a first range as a range of one of the command and a controlled value for the control, the first mark indicating one of the command and the controlled value associated with the first region, the second region corresponding to a second range as the movable range of the operation member, the second mark indicating the operation amount associated with the second region,
wherein the operation device is configured such that the first range includes a first effective range and a first ineffective range, the first effective range defining an allowable range of the control of the movable optical element and the first ineffective range defining a non-allowable range of the control of the movable optical element,
wherein the operation device is configured such that the second range includes a second effective range, the second effective range corresponding to the first effective range and not corresponding to the first ineffective range,
wherein the controller is configured to cause the display to display (1) a first effective region corresponding to the first effective range and a first ineffective region corresponding to the first ineffective range within the first region, and (2) a second effective region corresponding to the second effective range within the second region,
wherein the first mark and the second mark indicate respective values corresponding to the same characteristic of the optical apparatus, and
wherein the controller is configured to cause the display to display the first region and the second region such that a longitudinal direction of the first region and a longitudinal direction of the second region are parallel to each other.

2. The operation device according to claim 1, wherein the controller is configured to obtain the controlled value from the optical apparatus.

3. The operation device according to claim 1, wherein the controller is configured to cause the display to display the first region and the second region such that the first region and the second region are aligned with each other in the longitudinal directions thereof.

4. The operation device according to claim 1, wherein the controller is configured to set the effective range within the first range.

5. The operation device according to claim 1, wherein the controller is configured to change a relationship between the operation amount and the command.

6. The operation device according to claim 1, wherein the operation device is configured to operate the optical element with the optical characteristic being one of an object distance, a focal length, and an effective aperture.

7. The operation device according to claim 1, wherein the first mark indicates a position in the first region, the position corresponding to one of the command and the controlled value.

8. The operation device according to claim 1, wherein the second mark indicates a position in the second region, the position corresponding to the operation amount.

9. The operation device according to claim 1, wherein the operation device comprises the display.

10. An optical apparatus comprising:
an operation device for performing control of a movable optical element to change an optical characteristic of the optical apparatus, the operation device including:
an operation member operating in a movable range, a detector configured to detect an operation amount of the operation member, and
a controller configured to generate a command for the control based on the operation amount,
wherein the controller is configured to cause a display to display a first region, a first mark, a second region, and a second mark, the first region corresponding to a first range as a range of one of the command and a controlled value for the control, the first mark indicating one of the command and the controlled value associated with the first region, the second region corresponding to a second range as the movable range of the operation member, the second mark indicating the operation amount associated with the second region,
wherein the operation device is configured such that the first range includes a first effective range and a first ineffective range, the first effective range defining an allowable range of the control of the movable optical element and the first ineffective range defining a non-allowable range of the control of the movable optical element,
wherein the operation device is configured such that the second range includes a second effective range, the second effective range corresponding to the first effective range and not corresponding to the first ineffective range,
wherein the controller is configured cause the display to display (1) a first effective region corresponding to the first effective range and a first ineffective region corresponding to the first ineffective range within the first region, and (2) a second effective region corresponding to the second effective range within the second region; and
the movable optical element configured to be operated by the operation device,
wherein the first mark and the second mark indicate respective values corresponding to the same characteristic of the optical apparatus, and
wherein the controller is configured to cause the display to display the first region and the second region such that a longitudinal direction of the first region and a longitudinal direction of the second region are parallel to each other.

11. An imaging apparatus comprising:
an optical apparatus including
  an operation device for performing control of a movable optical element to change an optical characteristic of the optical apparatus, the operation device including:
    an operation member operating in a movable range,
    a detector configured to detect an operation amount of the operation member, and
    a controller configured to generate a command for the control based on the operation amount,
    wherein the controller is configured to cause a display to display a first region, a first mark, a second region, and a second mark, the first region corresponding to a first range as a range of one of the command and a controlled value for the control, the first mark indicating one of the command and the controlled value associated with the first region, the second region corresponding to a second range as the movable range of the operation amount, the second mark indicating the operation member associated with the second region,
    wherein the operation device is configured such that the first range includes a first effective range and a first ineffective range, the first effective range defining an allowable range of the control of the movable optical element and the first ineffective range defining a non-allowable range of the control of the movable optical element,
    wherein the operation device is configured such that the second range includes a second effective range, the second effective range corresponding to the first effective range and not corresponding to the first ineffective range, and
    wherein the controller is configured to cause the display to display (1) a first effective region corresponding to the first effective range and a first ineffective region corresponding to the first ineffective range within the first region, and (2) a second effective region corresponding to the second effective range within the second region;
  the movable optical element configured to be operated by the operation device; and
an imaging element configured to receive light from the optical apparatus,
wherein the first mark and the second mark indicate respective values corresponding to the same characteristic of the optical apparatus, and
wherein the controller is configured to cause the display to display the first region and the second region such that a longitudinal direction of the first region and a longitudinal direction of the second region are parallel to each other.

12. An operation device for performing control of a movable optical element to change an optical characteristic of an optical apparatus, the operation device comprising:
an operation member operating in a movable range;
a detector configured to detect an operation amount of the operation member; and
a controller configured to generate a command for the control based on the operation amount,
wherein the controller is configured to cause a display to display a first region, a first mark, a second region, and a second mark, the first region corresponding to a first range as a range of one of the command and a controlled value for the control, the first mark indicating one of the command and the controlled value associated with the first region, the second region corresponding to a second range as the movable range of the operation member, the second mark indicating the operation amount associated with the second region,
wherein the operation device is configured such that the first range includes a first effective range, the first effective range defining an allowable range of the control of the movable optical element,
wherein the operation device is configured such that the second range includes a second effective range and a second ineffective range, the second effective range corresponding to the first effective range, the second ineffective range corresponding to at least one of a minimum or a maximum of the first effective range,
wherein the controller is configured to cause the display to display (1) a first effective region corresponding to the first effective range within the first region, and (2) a second effective region corresponding to the second effective range and a second ineffective region corresponding to the second ineffective range within the second region wherein the first mark and the second mark indicate respective values corresponding to the same characteristic of the optical apparatus, and wherein the controller is configured to cause the display to display the first region and the second region such that a longitudinal direction of the first region and a longitudinal direction of the second region are parallel to each other.

13. The operation device according to claim 12, wherein the controller is configured to obtain the controlled value from the optical apparatus.

14. The operation device according to claim 12, wherein the controller is configured to cause the display to display the first region and the second region such that the first region and the second region are aligned with each other in the longitudinal directions thereof.

15. The operation device according to claim 12, wherein the controller is configured to set the second ineffective range within the second range.

16. The operation device according to claim 12, wherein the controller is configured to change a relationship between the operation amount and the command.

17. The operation device according to claim 12, wherein the operation device is configured to operate the optical element with the optical characteristic being one of an object distance, a focal length, and an effective aperture.

18. The operation device according to claim 12, wherein the first mark indicates a position in the first region, the position corresponding to one of the command and the controlled value.

19. The operation device according to claim 12, wherein the second mark indicates a position in the second region, the position corresponding to the operation amount.

20. The operation device according to claim 12, wherein the operation device comprises the display.

21. An optical apparatus comprising:
an operation device of claim 12; and
the movable optical element configured to be operated by the operation device.

22. An imaging apparatus comprising:
an optical apparatus of claim 21; and
an imaging element configured to receive light from the optical apparatus.

\* \* \* \* \*